United States Patent [19]

Robinson et al.

[11] 4,102,223
[45] Jul. 25, 1978

[54] AUTOMATIC SHARPENING MACHINE FOR SAW CHAINS

[76] Inventors: Geoffrey H. Robinson; Ronald F. Robinson, both of 2598 Weston Rd., Weston, Ontario, Canada, M9N 2A8

[21] Appl. No.: 730,336

[22] Filed: Oct. 7, 1976

[51] Int. Cl.² ............................................. B23D 63/16
[52] U.S. Cl. ..................................... 76/25 A; 76/37
[58] Field of Search ..................... 76/25 A, 40, 37, 35

[56] References Cited

U.S. PATENT DOCUMENTS

| 2,811,873 | 11/1957 | Nielsen | 76/40 |
| 3,071,026 | 1/1963 | De Witt | 76/25 A |

*Primary Examiner*—Harold D. Whitehead
*Assistant Examiner*—Roscoe V. Parker
*Attorney, Agent, or Firm*—David W. Wong

[57] ABSTRACT

The device is for mounting a saw chain firmly and securely for sharpening its cutter elements and for automatically advancing the cutter elements one by one consecutively through a sharpening station for sharpening by the grinding wheels. The holding device includes two pairs of holding finger elements which coact with a back plate to clamp on to the rivets of the cutter elements to be sharpened. The automatic advancing device includes an index finger mounted on a sliding platform which is slidable juxtaposed to the saw chain support. The index finger is operative to abut a selected cutter element and to advance a pair of left hand and right hand cutter elements to the sharpening station in each forward and backward movement cycle of the sliding platform. A pair of positioning plungers are provided to ensure the cutter elements are properly positioned in the shapening station before they are clamped in place for sharpening by the grinding wheels.

16 Claims, 10 Drawing Figures

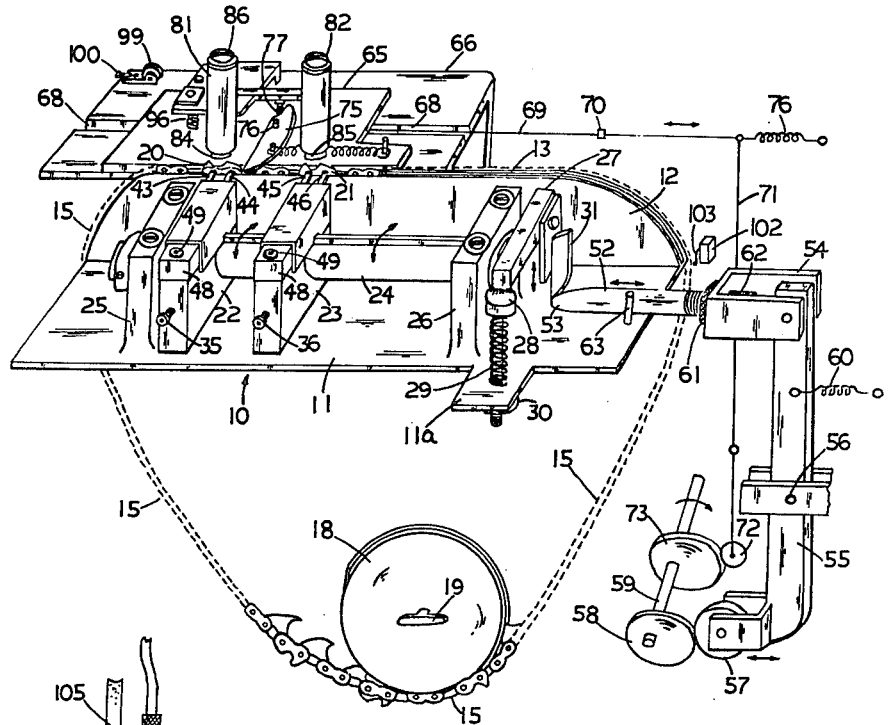
FIG. 1
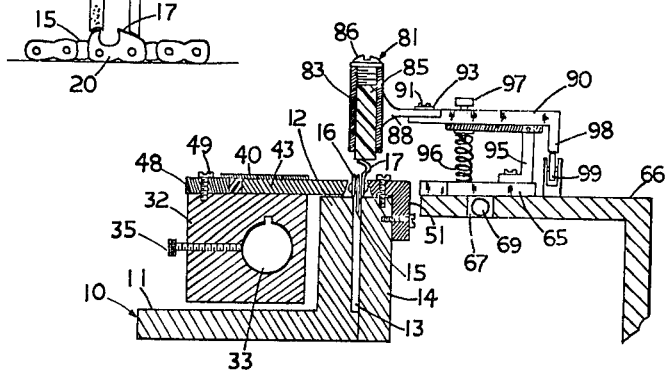
FIG. 8
FIG. 2

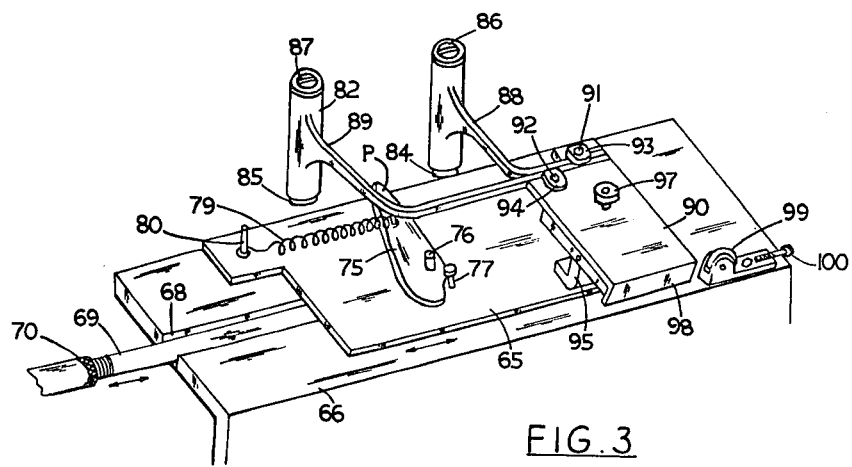
FIG. 3
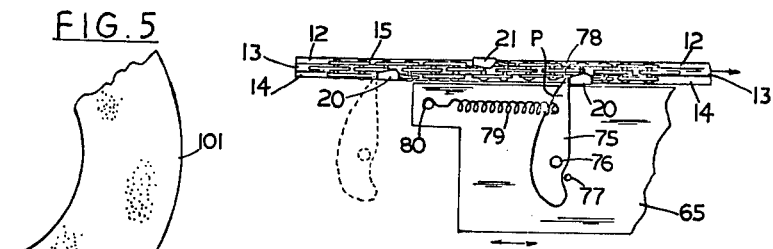
FIG. 5
FIG. 4
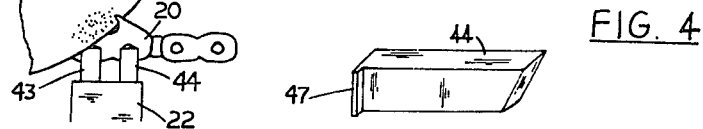
FIG. 7
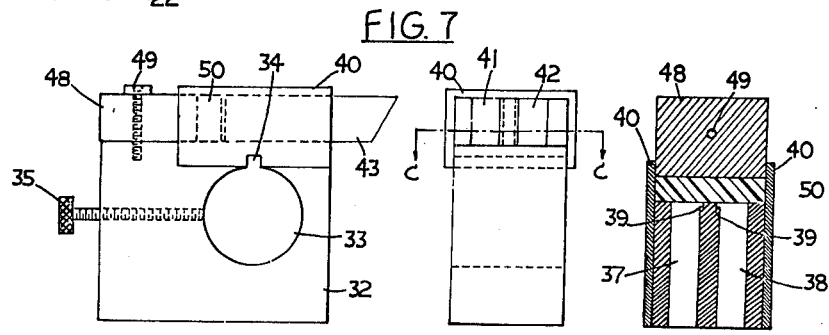
FIG. 6a    FIG. 6b    FIG. 6c

AUTOMATIC SHARPENING MACHINE FOR SAW CHAINS

BACKGROUND OF THE INVENTION

This invention relates to saw chain sharpening machines, and more particularly relates to sharpening machines having means for holding the chain securely and firmly during the sharpening operation and means for automatically advancing the chain stepwise on the holder for sharpening all its cutter elements.

In sharpening a saw chain, the chain is commonly mounted on a support such that its cutter elements are positioned in an upright manner for sharpening by a grinding means such as a dressed or shaped grinding disc or wheel. The support is usually in the form of a groove holder having an open end groove therein. The chain is placed upon the support with its central drive links extending downwardly into the groove and the side plates of each link riding on the two sides of the groove. The chain may thus be slidably moved along the groove for positioning its cutter elements one by one consecutively for sharpening by the grinding disc or discs. Since the grinding disc exerts a considerable force in the transverse direction to the chain, the cutter element being sharpened tends to move sideways. Such sideways movement of the cutter element during the sharpening operation can greatly affect the accuracy of the surface being sharpened.

Clamping means have been used for securely holding the cutter element while it is being sharpened. However, known clamping means are either complex in structure or time consuming to operate. Furthermore, such clamping means usually provide gripping on the central drive links or the side plates of the links, and they often cause distortion or breakage in these elements in the chain.

In some sharpening machines, a latch finger is incorporated on the holder for abutting the cutter element in the side opposite to the cutter surface in order to reduce the sideway movement of the cutting element while it is being sharpened. However, such latch finger either does not provide satisfactory anchoring to prevent the sideway movement or is difficult to operate.

Also, heretofore the advancement of the chain in sharpening machines is carried out manually. The operator must repeat the steps of positioning the cutter elements one by one in a sharpening station and positioning the grinding disc in the cutter element thus positioned for sharpening. Such repeating operations are both tedious and time consuming to carry out.

BRIEF DESCRIPTION OF THE INVENTION

The principal object of the present invention is to provide a saw sharpening machine having a means for firmly holding the cutter elements being sharpened firmly in place whereby there is no movement whatsoever in the cutter elements to affect the accuracy of the sharpened surfaces.

Another object of the present invention is to provide an advancing means in the sharpening machine for automatically advancing the cutter elements of the saw chain for sharpening.

These together with other objects and advantages which will become subsequently apparent reside in the details of construction and operation of an embodiment by example as more fully hereinafter described and claimed, reference being had to the accompanying drawings forming a part thereof, wherein like numerals refer to like parts throughout.

BRIEF DESCRIPTION OF THE DRAWINGS

In the drawings:

FIG. 1 is a partially schematic perspective view of the sharpening device according to the present invention;

FIG. 2 is a partial sectional side view of the device;

FIG. 3 is a rear perspective view of the chain advancing mechanism according to the present invention;

FIG. 4 is a top view of the chain advancing mechanism;

FIG. 5 is a schematic perspective view showing the cutter element being sharpened by a grinding wheel;

FIG. 6a is a side view of the holding means for the cutter element;

FIG. 6b is an end view of the locking element without the holding elements mounted therein;

FIG. 6c is a section view of the locking element taken along line C—C in FIG. 6b;

FIG. 7 is a perspective view of the holder finger element according to the invention; and FIG. 8 is a perspective front view of the means for grinding the depth gauge of the cutter elements in the saw chain.

DETAILED DESCRIPTION OF THE INVENTION

Referring to the drawings, the automatic saw chain sharpening device according to the present invention comprises a support body 10 which has a horizontal pedestal 11 and a vertical chain support block 12 extending upwardly and perpendicularly at the rear edge of the pedestal 11. The chain support block 12 has an open end groove 13 formed therein and extending throughout the entire length of the upper surface thereof. The chain support block 12 may be integrally formed with the pedestal or it may include a second vertical support member 14 mounted thereto to provide the groove 13. A saw chain 15 to be sharpened may be slidably positioned on the support block 12 by locating it along the groove such that the central drive links 15 of the chain extend downwardly into the groove and the side plates 16 and 17 of the links ride on the two spaced upper sides of the support block (as best shown in FIG. 2). The two ends of the support block slope downwardly to guide the chain downwardly to a rotatable wheel 18 which may also have a groove on its periphery for engagement with the central drive links of the chain. The wheel 18 may be slidably mounted on a vertical support (not shown) by a winged bolt 19 in order to maintain the chain securely and slidably mounted around the wheel 18 and the support block 12.

The means according to the present invention for holding the cutter elements 20 and 21 of the chain for sharpening comprises two locking members 22 and 23 slidably mounted on a keyed shaft 24 which is journalled on two fixed bearings 25 and 26 mounted on the pedestal 11. The locking members 22 ad 23 are rotatable by rotating the shaft 24. A pivotal lever 27 is mounted to the end of the shaft 24 such that it is pivotable to provide a rotating movement in the shaft 24. The front end of the pivotal lever 27 is secured, such as by welding, to the head of a pin 28 having a compression spring 29 mouned thereon. The lower end of the pin 28 extends slidably and movably through a hole in an extension portion 11a of the pedestal and is secured in position by a nut 30 in co-operation with the spring 29. The compression spring 29 also maintains the pivotal lever 27 normally in an upwardly pivoted condition. The pivoted position of the front end of the lever 27 may be adjusted by adjusting the nut 30 to change the length of the pin 28 in order to vary the tension of the spring 29. A vertical slider arm 31 is mounted at the rear end of the lever 27 such that the rear end of the lever 27 may be pivoted upwards against the biassing force of the compression spring 29 by urging the vertical slider arm 31 upward. The vertical slider arm has a slanted lower edge.

Each of the locking members 22 and 23 comprises a substantially rectangular body 32 having a transverse through opening 33 therein for slidably mounting the locking member on the keyed shaft 24. The opening 33 has a key groove 34 adapted to engage with the longitudinal key on the keyed shaft 24 such that the locking member is rotatable with the rotation of the keyed shaft 24. The locking elements 22 and 23 are secured at selected locations along the keyed shaft by set screws 35 and 36 respectively. Two spaced parallel grooves 37 and 38 are formed in the top surface of the square body 32 of each locking member (as best shown in FIG. 6c). Grooves 37 and 38 have a step 39 formed at a rear edge therein. The spacing between grooves 37 and 38 is equal to the standard spacing between the rivets in on link element in a saw chain. A typical spacing is about three-eighths inch. An inverted U-shaped cover member 40 is fixedly mounted over the top front portion of the square body so that the web portion of the cover member and the grooves 37 and 38 form two spaced parallel housings on the top front portion of the locking member. Elongated rectangular holder finger elements 43, 44 and 45, 46 (see FIG. 7) are slidably insertable in the housings thus formed in the locking members 22 and 23 respectively. The holder finger elements have a shoulder 47 formed at their rear ends which is adapted to engage with the step 37 in the housings for preventing the holder finger elements from sliding out the front of the housings.

The holder finger elements are secured in place in the housings by a rectangular abutting member 48 removably mounted on the top rear portion of the square body by a bolt 49. A resilient buffer element 50 such as a rectangular neoprene member may be placed between the abutting member and the holder finger elements. The buffer element and a front portion of the abutting member are enclosed by the U-shaped cover member 40 to prevent dirt and/or other foreign matters from entering the housing. Each of the holder elements 43, 44, 45, and 46 has a slightly bevelled front end (see FIGS. 6a and 7). The reason for the provision of such bevelled front end will become apparent in the descriptions below.

The locking members 22 and 23 are mounted on the keyed shaft 24 with the bevelled front ends of the holder finger elements 43, 44 and 45, 46 respectively aligned with the pair of rivets in the neighbouring left hand and right hand cutter elements of the saw chain 15 mounted on the open end groove 13 of the support block 12. The spacing between the locking members 22 and 23 may be adjusted to correspond to different spacing between cutter elements in different makes of saw chains. The bevelled front ends of the holder finger elements are in pressing abutment with the rivets on the cutter elements by the action of the biassing spring 29 which exerts a rotating force on the keyed shaft 24. An inverted L-shaped elongated back plate 51 is adjustably mounted on the top of the second vertical support member 14 (see FIG. 2). The back plate 51 has a length longer than three link elements in the saw chain and the front surface of the horizontal portion of the back plate is bevelled downwardly so that the back plate 51 co-acts with the holder finger elements of the locking members to clamp onto the rivets of the cutter elements so as to hold the cutter elements fixedly in place for the sharpening operation. The bevelled front ends of the holder finger elements and the bevelled front edge of the back plate also provide an action of pressing the cutter elements downwards firmly against the top of the support block to eliminate any possible movement. The resilient buffer elements 50 provide the required compensation for the variation in length of rivets in a saw chain, which may vary in some cases up to five thousandth of an inch.

The vertical slider arm 31 is raisable by the action of a cam rod 52 which has a tapering front end 53. The vertical slider arm 31 is raised upwardly when the front end 53 of the cam rod 52 is moved to engage slidably with the slanted lower edge of the vertical slider arm, thus pivoting the pivotal arm 27 against the biassing force of the spring 29 so as to rotate the keyed shaft counterclockwise to cause the holder finger elements to disengage from the clamping contact with the saw chain.

The cam rod 52 is adjustably connected to a yoke member 54 at a top end of an elongated arm 55 which is pivotally mounted at about its midpoint to a mounting point 56. A roller 57 is rotatably mounted at the lower end of the elongated arm 55. The roller 57 is in a surface contact engagement with a cam 58 mounted on a power shaft 59 rotatable by a drive means such as an electric motor (not shown). The roller 57 is maintained in contact with the cam 58 by a tension spring 60 provided at the upper portion of the elongated arm 55. The length of the cam rod 52 is adjustable by adjusting the threaded ring 61 so as to change the amount of the threaded end 62 of the cam rod 52 disposed within the yoke member 54. Thus, the length of the cam rod 52 can be adjusted selectively to vary the length of time the holder finger elements are engaged or disengaged with the saw chain. A vertical abutment pin 63 may be provided on the pedestal 11 for preventing lateral movement to occur in the sliding cam rod 52.

The automatic chain advancing mechanism according to the present invention comprises a sliding platform 65 slidably disposed on a support table 66. An elongated key member 67 is provided in the underside of the platform 65 which is slidably engageable in a longitudinal groove 68 provided on the support table such that the platform is only slidable in the longitudinal direction on the table. The end of the key member 67 is connected to an adjustable connecting rod 69 shown in FIGS. 1 and 3. The length of the connecting rod 69 is variable by an adjustable element 70 and is connected to a second elongated pivotal arm 71 schematically shown in FIG. 1. A roller 72 is provided at the lower end of the pivotal arm 71 and is in surface contact engagement with a second cam 73 which may also be mounted on the drive shaft 59. Thus, the sliding platform 65 is slidably movable by the coaction of the roller 72 and the second cam 73. The sliding platform 65 may be biased against the action of the connecting rod 69 by a spring 74 or a counterbalancing weight and a pulley arrangement connected to the connectng rod 69 or to the sliding platform directly.

An index finger element 75 is pivotally mounted on the sliding platform 65 on a mounting pin 76. The index finger element 75 has a tapering shape with a pointed front end P extending forwardly for engaging with the rear end of the cutter elements on the saw chain mounted on the support block 12 as best shown in FIG. 4. An abutment pin 77 prevents the index finger element 75 from rotating counterclockwise. Thus, when the sliding platform 65 is moved forward by the connecting rod 69, the index finger 75 will advance the cutter element of the chain accordingly due to the engagement of its pointed end P with the rear end of the selected cutter element. The index finger element 75 is biassed by a spring 79 mounted between the index finger element and a fixed post 80 provided on the sliding platform. The index finger element 75 has a curved side facing the cutting element so that when the sliding platform is moved backwards towards the side of the connecting rod, the index finger will pivot against the force of the spring 79 to glide over the saw chain as shown in FIG. 4. At the end of the sliding movement of the platform, the index finger element will engage with another selected cutter element.

In a common standard saw chain, there are alternate left hand cutter elements and right hand cutter elements positioned on opposite sides of the chain and having opposite cutting surfaces. The index finger element is designed to engage a new right hand cutter element at the end of each backward movement such that it will advance a pair of left hand and right hand cutter elements to the sharpening station in each advance cycle.

Two adjustable plungers 81 and 82 are provided for ensuring that the cutter elements at the sharpening station are properly positioned on the support block. Each of the plungers 81 and 82 comprises a vertical cylindrical housing 83 having a cylindrical pressing member 84 and 85 mounted therein respectively. The pressing member may be made of slightly resilient material such as neoprene. The length of the pressing members 84 and 85 extending outwards beyond the end of the housing 83 may be adjusted by screws 86 and 87 provided at the top end of the plungers 81 and 82 respectively. The plungers 81 and 82 are connected to two cantilever arms 88 and 89 which are slidably secured to the forward end of a pivot member 90. The cantilever arms 88 and 89 are secured in place by bolts 91 and 92 with associated securing plates 93 and 94 so that the spacing between the plungers may be adjusted by loosening the bolts 91 and 92 and sliding the cantilever arms until the desired spacing is obtained and then re-tightening the bolts to fix the plungers in the selected spacing. The pivot member 90 is pivotally mounted on a pivot post 95 and it is biassed by a compression spring 96 mounted on an adjusting screw 97 whereby the plungers are normally positioned in a spaced manner above the saw chain 15. The pivot member 90 has a downwardly extending flange 98 provided at its rear end. The flange 98 will engage a roller cam 99 mounted on the support table 66 at the end of each forward movement of the platform 65 at which time a new pair of left hand and right hand cutter elements 20 and 21 will be advanced by the index finger element to the sharpening station. Thus, the plungers will press downward on the pair of cutter elements reaching the sharpening station to ensure that they are properly positioned on the support block 12 while their rivets are being engaged by the holder finger elements. The position of the roller cam 99 may be selectively adjusted by an adjustment screw 100.

In operation, the cam rod 52 is swung upwards in order that the saw chain 15 may be mounted about the support block 12 and rotatable wheel 18 with the central drive links extending into the open end groove 13. The position of the rotatable wheel is adjusted until a desirable tension exists in the saw chain such that it is securely and slidably mounted along the support block 12. The cam rod 52 is then swung back into the horizontal position. The positions of the locking members 22 and 23 are adjusted by loosening the set screws 35 and 36 until the holder finger elements 43 and 44 are spaced from the rivets of a left hand cutter element 20 and the holder finger elements 45 and 46 are spaced from the rivets of the next right hand cutter element 21 of the saw chain 15.

The sliding platform 65 and the plungers 81 and 82 are then adjusted until the pressing members 84 and 85 are pressing on the cutter elements 20 and 21 respectively at the end of each forward movement of the platform 65 when the cutter elements reach the sharpening station. Furthermore, the connecting rod 69 is adjusted so that the index finger element 75 will, for example, engage a consecutive selected right hand (or left hand) cutter element in each complete cycle of the forward and backward movement of the sliding platform 65.

With the above preliminary adjustments, the saw chain is ready to be sharpened.

The drive motor for the drive shaft 59 is actuated such that the cams 73 and 58 are rotated to disengage the cam rod with the lower end of the vertical slider arm 31 and the holder finger elements 43, 44, 45 and 46 thus become pressingly engaged with the rivets of the cutter elements 20 and 21 located at the sharpening station. In the meantime, the sliding platform 65 is pulled towards the connecting rod 69 away from the sharpening station and the cutter elements will be clamped firmly in place by the coaction between the holder finger elements 43, 44, 45 and 46 and the back plate 51. The grinding discs 101 are operated to alternately sharpen the cutting surface of the cutter elements 20 and 21 at the sharpening station when the platform 65 has moved to the end of its backward movement.

The forward movement of the platform 65 will commence as soon as both cutter elements have been sharpened and the index finger element 75 will then engage with the rear end of the next right hand cutter element 20 on the chain.

The cam rod is then moved to engage the vertical slider arm 31 so as to disengage the holder finger elements from the rivets of the already sharpened cutter elements 20 and 21 when the sliding platform 65 and thus the index finger element are being moved to advance the next cutter elements forward. As soon as the platform 65 reaches the end of its forward movement, the flange 98 of the pivot member 90 will engage the roller cam 99 so that the plungers 81 and 82 are pressed downward over the new pair of cutter elements now positioned at the sharpening station by the index finger element so as to assure that the cutter elements are properly positioned on the support block 12.

The platform 65 will commence its backward movement when the cutter elements are secured in the sharpening station by the holder finger elements. A new sharpening cycle will thus commence. In the above manner, the saw chain is automatically advanced and sharpened by the device of the present invention.

In the embodiment shown above by way of example of the present invention, the device is for automatically sharpening conventional standard type saw chains having alternate left hand and right hand cutter elements linked by linking elements. A microswitch 102 may be mounted in the vicinity of the support block 12 such that its switching arm 103 is in contact with the advancing cutter elements. The microswitch 102 is actuable by any irregular neighbouring pairs of left hand or right hand cutter elements in the standard saw chain so as to stop the drive motor in order to halt the operation of the entire apparatus.

Additionally, the depth gauge or rakers of the sharpened cutter elements normally require grind to reduce its height in order that the sharpened saw chain can operate properly. An arrangement, as shown in FIG. 8, may be incorporated in the device of the present invention for such purpose. The arrangement comprises a vertical holder finger 104 which is operative to press downward on the cutter 17 of the cutter element 20 in order to hold it securely mounted on the support block 15. The vertical holder finger 104 is adjustable for varying its vertical position so as to compensate for the variations in the vertical dimension of the cutter element. A grinding wheel 105 can be adapted to grind the depth gauge to the required height when the cutter element is securely held in place by the vertical holder finger.

While illustrative forms of apparatus and methods in accordance with the invention have been described and shown herein, it will be understood that numerous changes may be made without departing from the general principles and scope of the invention.

I claim:

1. In a machine for automatically sharpening cutter elements of a saw chain, an apparatus for mounting said saw chain comprising a support means having an elongated groove therein operative for receiving said saw chain to be slidably mounted thereon, holder finger means for engaging mounting rivets of a selected cutter element in said saw chain, said holder finger means being carried by at least one rectangular block body which is adjustably mounted on a rotatable keyed shaft disposed adjacent said support means and extending in the direction of elongation of said groove bias means connected to said shaft for operatively providing a rotating force to said shaft to cause said holder finger means to abut pressingly said rivets of said selected cutter element, and a back plate mounted on said support means cooperative with said holder finger means to clamp said selected cutter element firmly on said support means while said selected cutter element is being sharpened by a grinding disc.

2. An apparatus according to claim 1, including control means operative for rotating said shaft against said bias means to disengage said holder finger means from abutting contact with said rivets of said selected cutter element after said selected cutter element has been sharpened.

3. An apparatus according to claim 2, wherein said bias means comprises a pivot arm secured to said shaft, one end of said pivot arm being biassed by a resilient means for providing said rotating force normally in said shaft.

4. An apparatus according to claim 2, wherein said control means comprises a vertical slider arm connected to the other end of said pivot arm, a rod means operative to engage with said slider arm so as to pivot said pivot arm against said bias means for rotating said shaft to disengage said holder finger means from the abutting contact with said selected cutter element.

5. An apparatus according to claim 4, wherein said rod means comprises a rod element having a tapering end slidably engageable with said slider arm for pivoting said pivot arm, and a threaded end threadingly mounted through an adjustment means to a top end of a vertical elongated pivotal coupling element, said adjustment means being operative for varying the length of said rod element.

6. An apparatus according to claim 5, including a cam means operatively engaging the lower end of said vertical coupling element, said cam means being coupled to a rotatable drive shaft operative to rotate said cam means so as to move said tapering end of said rod element to engage selectively with said slider arm.

7. An apparatus according to claim 1, wherein said holder finger means are two rectangular rods slidably mounted in two housings provided at the top front portion of said rectangular block body, an abutting element removably mounted to the top rear portion of said block body for retaining said holder finger means in said housing and resilient buffer element disposed between said abutting element aand said holer finger means.

8. An apparatus according to claim 7, wherein said rectangular rods have a bevelled front end sloping downwardly and rearwardly towards said block body, said bevelled front end being operative to engage in pressing contact with said rivets of said selected cutter element, and said back plate also has a bevelled surface cooperative with the bevelled front end of said rectangular rods to clamp said rivets of said selected cutter element securely whereby said cutter element is held firmly on said support means for sharpening by a grinding disc.

9. In a machine for automatically sharpening cutter elements of a saw chain according to claim 1, including an automatic chain advancing device comprising a platform slidably mounted on a support table disposed juxtaposed to said support means for said saw chain, an index finger means pivotally mounted on said platform and having a pointed end therein engageable with a rear end of a selected cutter element in said saw chain mounted on said support means, a drive means coupled to said platform operative for moving said platform with respect to said support table, whereby said selected cutter element is movable to a sharpening station by said index finger means.

10. An apparatus according to claim 9, wherein said drive means comprises a cam means mounted on a rotatable drive shaft, and coupling means coupling said cam means to said platform.

11. An apparatus according to claim 10, wherein said coupling means includes an adjustable connecting member for adjusting the distance and time of movement of said platform whereby said platform moves in a forward direction when said holder finger members are disengaged from said selected cutter element, and moves in a rearward direction when said holder finger members are engaging in pressing contact with the rivets of said cutter element.

12. An apparatus according to claim 9, including at least one plunger means mounted on said platform and operative to press downward on said selected cutter element when the latter has advanced to the sharpening station by said index finger means so as to maintain said selected cutter element in position for clamping by said holder finger means.

13. An apparatus according to claim 12, wherein said plunger means is secured on a mounting means which is pivotally mounted on said platform, a compression spring mounted between said mounting means and said platform for urging said mounting means upwards whereby said plunger means is normally spaced above said saw chain, said mounting means having a downwardly extending flange provided at its rear edge engageable with a roller means mounted on said support table for pivoting said mounting means when said platform moves in said forward direction until said selected cutter element has been advanced to the sharpening station by said index finger means whereby said plunger means presses downwards on said selected cutter element so as to maintain said selected cutter element firmly in position at said sharpening station when said rivets of said selected cutter element are being clamped by said holder finger means.

14. An apparatus according to claim 13, wherein said plunger means comprises a vertical cylinder housing having a resilient cylindrical element mounted therein, an end portion of said resilient cylindrical element extending downwardly outside the lower end of said housing and adapted to engage said saw chain pressingly when said mounting means is pivoted by the engagement of said flange with said roller means.

15. An apparatus according to claim 13, wherein said resilient cylindrical element is made of neoprene, and an adjusting means is provided at the top end of said cylindrical housing operative for varying the length of said end portion of said resilient cylindrical element.

16. An apparatus according to claim 13, wherein said cylindrical housing has a centilever arm provided on its outer side wall, said cantilever arm being slidably and adjustably mounted to said mounting means.

* * * * *